US010291685B2

(12) United States Patent
Shang

(10) Patent No.: US 10,291,685 B2
(45) Date of Patent: May 14, 2019

(54) METHOD AND APPARATUS FOR CONTROLLING RUNNING OF SERVICE

(71) Applicant: Tencent Technology (Shenzhen) Company Limited, Shenzhen, Guangdong (CN)

(72) Inventor: Liang Shang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 67 days.

(21) Appl. No.: 15/167,487

(22) Filed: May 27, 2016

(65) Prior Publication Data

US 2017/0346908 A1 Nov. 30, 2017

(51) Int. Cl.
*H04L 29/08* (2006.01)

(52) U.S. Cl.
CPC ............ *H04L 67/025* (2013.01); *H04L 67/34* (2013.01)

(58) Field of Classification Search
CPC ............... H04L 29/08072; H04L 29/06; H04L 29/0809; H04L 29/06047; G06Q 30/02
USPC ......................................................... 709/203
See application file for complete search history.

(56) References Cited

U.S. PATENT DOCUMENTS

| | | | |
|---|---|---|---|
| 6,629,890 B2 | 10/2003 | Johnson | |
| 2002/0187834 A1* | 12/2002 | Rowe | G07F 17/32 463/42 |
| 2007/0077992 A1* | 4/2007 | Midgley | A63F 13/12 463/42 |
| 2009/0011830 A1* | 1/2009 | Wang | A63F 13/12 463/29 |
| 2010/0072699 A1* | 3/2010 | Bress | A63F 7/027 273/121 A |

FOREIGN PATENT DOCUMENTS

| | | |
|---|---|---|
| CN | 1629819 A | 6/2005 |
| CN | 1858759 A | 11/2006 |
| CN | 101159626 A | 4/2008 |
| CN | 101303712 A | 11/2008 |
| CN | 101841597 A | 9/2010 |

OTHER PUBLICATIONS

International Search Report and Written Opinion dated Jul. 17, 2015 for PCT Application No. PCT/CN2015/076733 (English and Chinese languages), 13 pp.
Office Action dated Jul. 31, 2018 for Chinese Application No. 201410164075.3, 8 pages.

* cited by examiner

*Primary Examiner* — Vivek Srivastava
*Assistant Examiner* — Hermon Asres
(74) *Attorney, Agent, or Firm* — Brinks Gilson & Lione

(57) ABSTRACT

A method and an apparatus for controlling running of a service are described. The method includes: acquiring service running information of a service on a client, the service running information including a service running parameter and a service running status, and the service running status including a running state or a non-running state; determining, when the service running status of the service is the running state, a service control mode of the service according to the service running parameter and a preset service control mode list; and performing feedback control on the service according to the service control mode of the service.

9 Claims, 6 Drawing Sheets

METHOD AND APPARATUS FOR CONTROLLING RUNNING OF SERVICE

CROSS REFERENCE OF RELATED APPLICATIONS

This application is a continuation of International Application No. PCT/CN2015/076733, filed on Apr. 16, 2015, which claims the priority to Chinese Patent Application No. 201410164075.3, filed on Apr. 22, 2014, both of which are hereby incorporated by reference in their entireties.

FIELD OF THE TECHNOLOGY

The present disclosure relates to the field of the Internet, and in particular, to a method and an apparatus for controlling running of a service.

BACKGROUND OF THE DISCLOSURE

During the rapid development of clients (referring client devices, for example, mobile phones), service developers have developed a large number of terminal application-oriented services, for example, online games. When a client occupies a service for a long time, a server breaks down easily and a large quantity of network resources are wasted, and at the same time, working efficiency of a client may also be reduced, and negative influence occurs easily.

Especially, as more and more young people are in possession of personal smart mobile terminals, adolescents may easily be excessively obsessed with online games, and significant influence on their lives occurs. An existing manner of controlling running of online games mainly gives reminders and can hardly exert corresponding effects of control.

In conclusion, one of the objectives of research in the field of the Internet is to appropriate approach to effectively controlling a service on a client to solve problems in the existing technology that when a service runs for a relatively long time or at a relatively high frequency, a server breaks down easily and network resources are wasted severely.

SUMMARY

Embodiments of the present invention provide a method and an apparatus for controlling running of a service, so that technical problems in the existing technology that when a service runs for a relatively long time or at a relatively high frequency, a server breaks down easily and network resources are wasted severely are solved, and effective feedback control on a service on a client is implemented.

A method for controlling running of a service, including: at a computing device having one or more processors and memory storing programs executed by the one or more processors: acquiring service running information of a service on a client, the service running information including a service running parameter and a service running status, and the service running status including a running state or a non-running state; determining, when the service running status of the service is the running state, a service control mode of the service according to the service running parameter and a preset service control mode list; and performing feedback control on the service according to the service control mode of the service.

An apparatus for controlling running of a service, including: one or more processors; a memory; and one or more program modules stored in the memory and executed by the one or more processors, the one or more program modules comprising: a running information acquisition module, configured to acquire service running information of a service on a client, the service running information including a service running parameter and a service running status, and the service running status including a running state or a non-running state; a control mode determination module, configured to determine, when the service running status of the service is the running state, a service control mode of the service according to the service running parameter and a preset service control mode list; and a feedback control module, configured to perform feedback control on the service according to the service control mode of the service.

In the embodiments of the present invention, service running information of a client is acquired, a service control mode is determined in a preset service control mode list according to the acquired service running information, and finally, feedback control is performed on a service of the client according to the determined service control mode, so that technical problems in the existing technology that when a service runs for a relatively long time or at a relatively high frequency, a server breaks down easily and network resources are wasted severely are solved, and effective feedback control on a service on a client is implemented.

DESCRIPTION OF EMBODIMENTS

Please refer to the drawings, where same component symbols represent same components, and the principle of the present disclosure is illustrated through implementation in a suitable operating environment. The following description is based on illustrated specific embodiments of the present invention, and should not be construed as a limitation on other specific embodiments that are not described in detail in the present disclosure.

In the description that follows, embodiments of the present invention will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that various steps and operations described hereinafter may also be implemented in hardware.

For the principle of the present disclosure, many other universal or objective-specific operations, communication environments or configurations are used for work. Examples of well-known operating systems, environments, and configurations suitable for use with the present disclosure include (but are not limited to) a handheld phone, a personal computer, a server, a multiprocessor system, a microcomputer-based system, a mainframe computer, and a distributed operating environment that includes any of the above systems or apparatuses.

The term "module" used in the specification may be regarded as a software object or a program that is executed on the operating system. The different components, modules, engines, and services in the specification may be regarded as implementation objects on the operating system. The apparatuses and methods in the specification are preferably implemented in the manner of software, and certainly may also be implemented on hardware. The cases all fall within the protection scope of the present disclosure.

Figure 1:
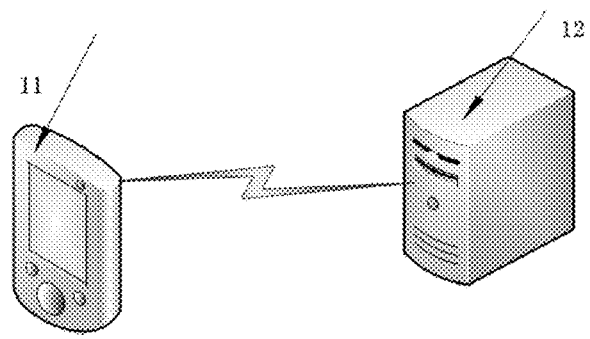
FIG. 1 is a schematic diagram of a running environment of an apparatus for controlling running of a service according to an embodiment of the present invention.

Referring to FIG. 1, FIG. 1 is a schematic diagram of a running environment of an apparatus for controlling running of a service implemented by the present disclosure. The service running control apparatus includes a client 11 and a service running server 12.

The client 11 is connected to the service running server 12 through the Internet. The client 11 may download a service from the service running server 12 and install the service. The service includes an application program, for example, an online game. The service running server 12 acquires, from the client 11, service running information of a service running on the client 11, where the service running information includes a service running parameter and a service running status. The service running parameter is, for example, running time, a running frequency, and the service running status includes two states: a running state or a non-running state. The non-running state of the service running status is, for example, a pause.

When the service running status of the client 11 is the running state, the service running server 12 determines a service control mode of the service according to the service running parameter and a preset service control mode list, and performs feedback control on the service of the client 11 according to the service control mode of the service, where the feedback control is, for example, reducing earnings and achievements in a game.

The client 11 may be a desktop computer, or a terminal machine, for example, a notebook computer, a work station, a handheld computer, an ultra mobile personal computer (UMPC), a tablet PC, a Personal Digital Assistant (PDA), a web pad, and a portable phone, that has a storage unit and is installed with a microprocessor to possess an operational capability.

The Internet may be a data communication network such as a local area network (LAN), a metropolitan area network (MAN), a wide area network (WAN), and the Internet, or may further be either a wired or wireless telephone network, and use of any communication manner is acceptable.

Figure 2:
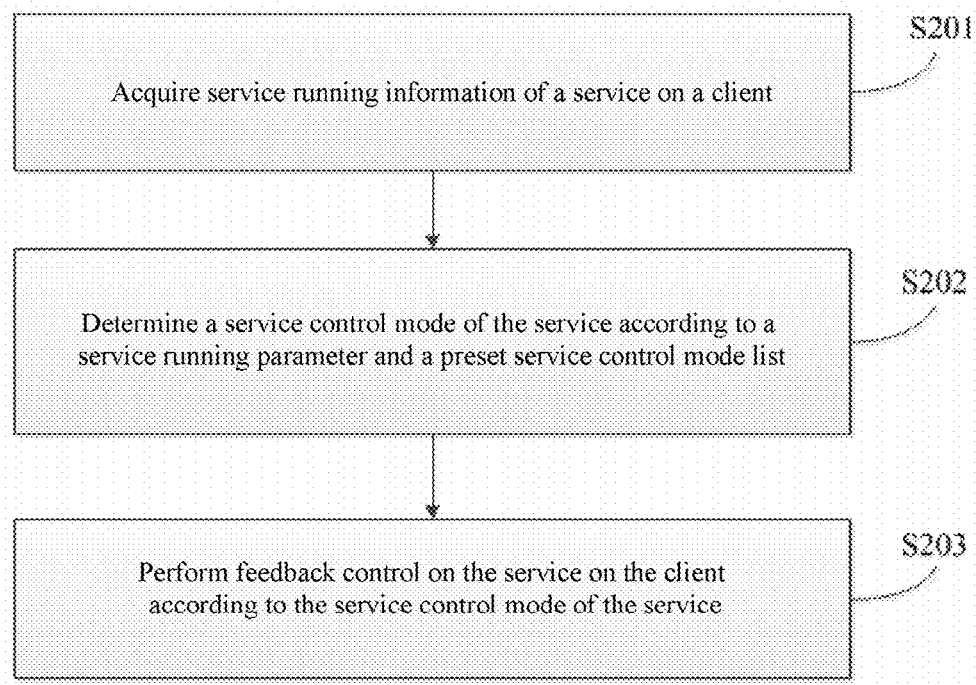
FIG. 2 is a schematic flowchart of a method for controlling running of a service according to an embodiment of the present invention.

Please refer to FIG. 2, which is a schematic flowchart of a method for controlling running of a service according to an embodiment of the present invention.

In step S201, the service running server 12 acquires service running information of a service on the client 11.

The service running information includes a service running parameter and a service running status, and the service running status includes a running state or a non-running state. The service running parameter mentioned in this implementation includes service running time, a service running frequency or a combination of service running time and a service running frequency. Certainly, the service running parameter may further include power consumption. The cases all fall within the protection scope of the present disclosure, and are no longer elaborated herein.

The running state in the service running status refers to that the service is currently running, for example, a QQ game that is running. The non-running state in the service running status refers to that a current service stops running, for example, a pause. Certainly, the non-running state in the service running status further includes Power Off. The cases all fall within the protection scope of the present disclosure, and are no longer enumerated herein.

In step S202, when the service running status is the running state, the service running server 12 determines a service control mode of the service on the client 11 according to the service running parameter and a preset service control mode list.

The service running parameter includes, but is not limited to, at least one of service running time and a service running frequency. The service running parameter corresponds to a service control mode list. The service control mode list may be a service running time control mode list, a service running frequency control mode list, or a service running time and service running frequency control mode list. For example, when the service running parameter is the service running time, a corresponding service control list is the service running time control mode list, and when the service running parameter is the service running frequency, a corresponding service control list is the service running frequency control mode list. During specific implementation, the service running parameter is compared with a preset threshold of a service running parameter to generate a comparison result, and a corresponding service control mode is selected from the service control mode list according to the comparison result.

The threshold of a service running parameter includes a proper running threshold and an excessive running threshold. The excessive running threshold is greater than the proper running threshold. When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range.

The threshold of a service running parameter may include multiple thresholds, which all fall within the protection scope of the present disclosure, and are not enumerated here.

How to acquire the corresponding service control mode list according to the service running parameter is described below by using a case where there are two thresholds for a service running parameter:

When the service running parameter is less than the proper threshold, the service control mode is to use the service normally. When the service running parameter is greater than or equal to the proper threshold and is less than the excessive threshold, the service control mode is to reduce a current acquisition value of a user in a service. When the service running parameter is greater than or equal to the excessive threshold, the service control mode is to clear a current acquisition value of a user in a service. The current acquisition value of the user in the service includes earnings, achievements, grades, and experience in the service, for example, earnings, achievements, grades, and experiences in a QQ game.

The service mode control list is not limited to the one above, and certainly there may also be other service mode control lists, which all fall within the protection scope of the present disclosure, and are not enumerated here.

In step S203, the service running server 12 performs feedback control on the service on the client 11 according to the service control mode.

The service control mode includes, for example, to reduce the current acquisition value of the user in the service, and clear the current acquisition value of the user in the service. Running of the service is limited by controlling the current acquisition value of the user in the service. For example, when game earnings in a QQ game are zero, the game stops running.

In the embodiment of the present invention, the service running server 12 acquires service running information of a service running on the client 11, the service running information including a service running parameter and a service running status, and the service running status including a running state or a non-running state, determines, when the service running status is the running state, a service control mode of the service according to the service running parameter and a preset service control mode list, and performs feedback control on the service on the client 11 according to the service control mode of the service. By means of the foregoing, technical problems in the existing technology that when a service runs for a relatively long time or at a relatively high frequency, a server breaks down easily and network resources are wasted severely are solved, and effective feedback control on a service on a client is implemented.

Figure 3:
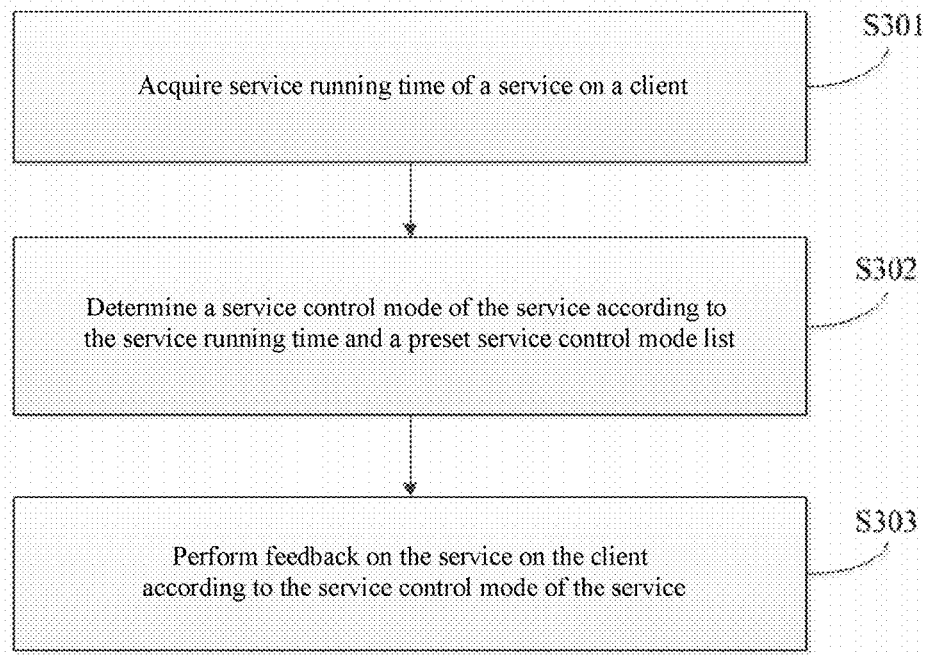
FIG. 3 is a schematic flowchart of a method for controlling running of a service according to an embodiment of the present invention.

Please refer to FIG. 3, which is a schematic flowchart of a method for controlling running of a service according to an embodiment of the present invention, where the service running parameter in the embodiment is the service running time.

In step S301, the service running server 12 acquires service running time of a service running on the client 11.

In step S302, the service running server 12 determines a service control mode of the service according to the acquired service running time of the service and the preset service control mode list.

The service control mode list corresponds to the service running parameter. The service control mode list includes a service running time control mode list, a service running frequency control mode list, or a service running time and service running frequency control mode list. For example, when the service running parameter is the service running time, it is acquired that the service control list is correspondingly the service running time control mode list. For example, when the service running parameter is the service running frequency, it is acquired that the service control mode list is correspondingly the service running frequency control mode list.

It is acquired according to the acquired running time of the service in step S301 that the corresponding service control list is the service running time control mode list. The service control mode list includes at least two service control modes, and each service control mode corresponds to a service running time period. During specific implementation, the service running parameter is compared with a preset threshold of a service running parameter to generate a comparison result, and a corresponding service control mode is selected from the preset service control mode list according to the comparison result.

The threshold of a service running parameter includes a proper running threshold and an excessive running threshold. The excessive running threshold is greater than the proper running threshold. When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when a monitored service running parameter is greater than or equal to A, it indicates an improper service running range.

For example, when the service running parameter is the service running time, the service running time control mode list include 3 service control modes. The service running time control mode list includes, for example: when the service running time is less than the proper running threshold A (for example, 0-2 hours), a first service control mode is selected to perform service control, and the current acquisition value of the user stays unchanged; when the service running time is greater than or equal to the threshold A and is less than the excessive running threshold B (for example, 4 hours), a second service control mode is selected to perform service control, that is, the current acquisition value of the user is reduced by 50%; and when the service running time is greater than or equal to the excessive running threshold B, a third service control mode is selected to perform service control, and the current acquisition value of the user is completely cleared. The current acquisition value of the user may be earnings, achievements, grades, and the like of a user in a QQ game. For example, the acquired service running time is 3.5 hours, and the second service control mode is selected from the service running time control list.

The service control mode list is not limited to the foregoing cases, and certainly there may also be other service running time control lists, which all fall within the protection scope of the present disclosure, and are not enumerated here.

In step S303, the service running server 12 performs feedback control on the service on the client 11 according to the service control mode of the service.

According to the selected service control mode in step S302, such as to reduce the current acquisition value of the user in the service, and to clear the current acquisition value of the user in the service, running of the service is limited by controlling the current acquisition value of the user in the service. For example, when game earnings in a QQ game are reset, the game stops running.

For example, the service running time acquired by the service running server 12 is 3.5 hours. According to the service running time control list in step S302, the current service running time is between 2 hours and 4 hours, and the corresponding service control mode is the second service control mode, so that the feedback control is to reduce the current acquisition value of the user by 50%.

In the embodiment of the present invention, the service running server 12 acquires service running time of a service running on the client 11, the service running server 12 determines a service control mode of the service according to the service running time and a preset service control mode list, and the service running server 12 performs feedback control on the service on the client 11 according to the service control mode of the service. By means of the foregoing, technical problems in the existing technology that when a service runs for a relatively long time or at a relatively high frequency, a server breaks down easily and network resources are wasted severely are solved, and effective feedback control on a service on a client is implemented.

Figure 4:
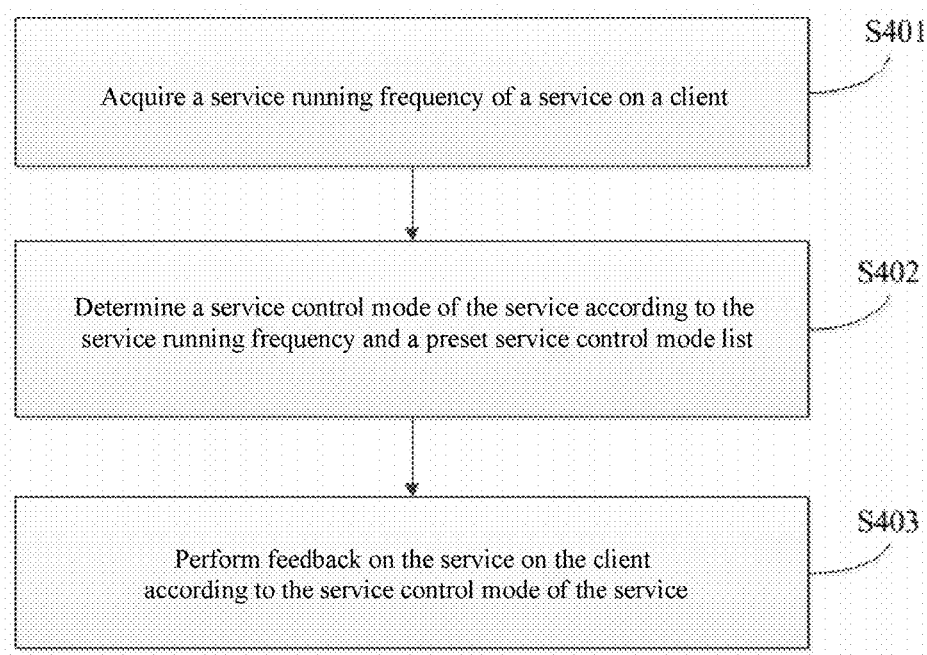
FIG. 4 is a schematic flowchart of a method for controlling running of a service according to an embodiment of the present invention.

Please refer to FIG. 4, which is a schematic flowchart of a method for controlling running of a service according to an embodiment of the present invention, where the service running parameter in the embodiment is a service running frequency.

In step S401, the service running server 12 acquires a service running frequency of a service running on the client 11.

In step S402, the service running server 12 determines a service control mode of the service according to the acquired service running frequency of the service and a preset service control mode list.

The service control mode list corresponds to the service running parameter. The service control mode list includes a service running time control mode list, a service running frequency control mode list, or a service running time and service running frequency control mode list. For example, when the service running parameter is the service running frequency, it is acquired that the service control list is the service running frequency control mode list.

It is acquired according to the service running frequency acquired in step S401 that the corresponding service control list is the service running frequency control mode list. The service control mode list includes at least two service control modes, and each service control mode corresponds to a service running frequency band. During specific implementation, the service running parameter is compared with a preset threshold of a service running parameter to generate a comparison result, and a corresponding service control mode is selected from the preset service control mode list according to the comparison result.

The threshold of a service running parameter includes a proper running threshold and an excessive running threshold. The excessive running threshold is greater than the proper running threshold. When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range.

For example, when the service running parameter is the service running frequency, the service control mode list includes 3 service control modes. The service running frequency control mode list, for example: When the service running frequency is less than the proper running threshold A (for example, 0 to 10 times/hour), a first service control mode is selected to perform service control, and the current acquisition value of the user stays unchanged. When the service running frequency is greater than or equal to threshold A and is less than the excessive running threshold B (for example, 30 times/hour), a second service control mode is selected to perform service control, and the current acquisition value of the user is reduced by 50%. When the service running frequency is greater than or equal to the excessive running threshold B, a third service control mode is selected to perform service control, and the current acquisition value of the user is completely cleared. The current acquisition value of the client is, for example, earnings, achievements, grades, and the like of a user in a game.

The service control mode list is not limited to the one above, and certainly there may also be other service control lists, which all fall within the protection scope of the present disclosure, and are not enumerated here. For example, the acquired service running frequency is 25 times/hour, and the second service control mode is selected from the service running frequency control list.

In step S403, the service running server 12 performs feedback control on the service on the client 11 according to the service control mode of the service.

According to the service running control mode determined in step S402, for example, including to reduce the current acquisition value of the user in the service, and to clear the current acquisition value of the user in the service, running of the service is limited by controlling the current acquisition value of the user in the service. For example, when game earnings in a QQ game are zero, the game stops running.

For example, the service running frequency acquired by the service running server 12 is 25 times/hour, and according to the service running frequency control list in step S402, the current service running frequency is between 10 times/hour and 30 times/hour, and the corresponding service control mode is the second service control mode, so that the current acquisition value of the user is reduced.

In the embodiment of the present invention, the service running parameter acquired by service running server 12 is a service running frequency, when the service running status is the running state, a service control mode of the service is determined according to the service running frequency and a preset service control mode list, and feedback control is performed on the service on the client 11 according to the service control mode of the service. By means of the foregoing, technical problems in the existing technology that when a service runs for a relatively long time or at a relatively high frequency, a server breaks down easily and network resources are wasted severely are solved, and effective feedback control on a service on a client is implemented.

Figure 5:
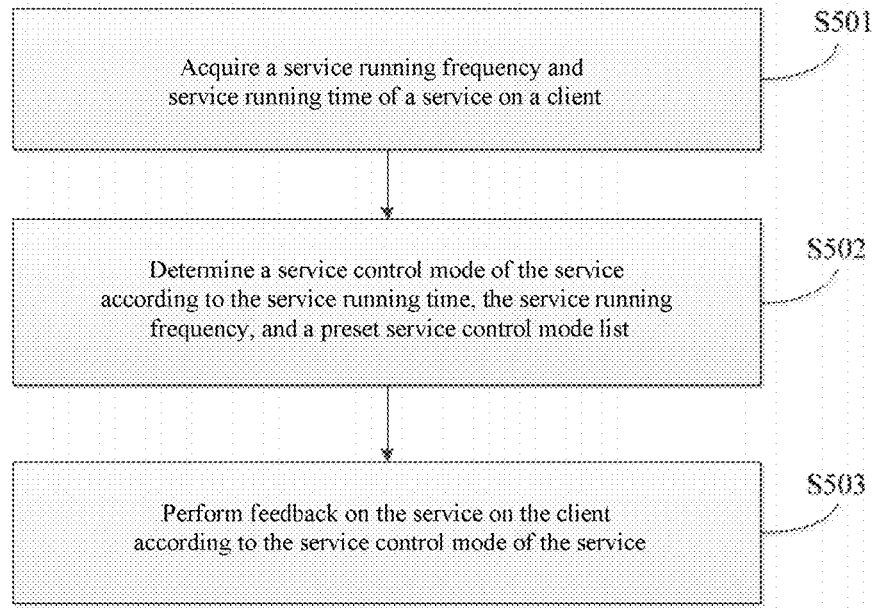
FIG. 5 is a schematic flowchart of a method for controlling running of a service according to an embodiment of the present invention.

Please refer to FIG. 5, which is a schematic flowchart of a method for controlling running of a service according to an embodiment of the present invention, where the service running parameter in the embodiment is service running time and a service running frequency.

In step S501, the service running server 12 acquires service running time and a service running frequency of a service running on the client 11.

In step S502, the service running server 12 determines a service control mode of the service according to the acquired service running frequency and service running time and a preset service control mode list.

A corresponding preset service control mode list is acquired according to the service running frequency and the service running time of the service acquired in step S501. The service control mode list corresponds to the service running parameter. The service control mode list includes a service running time control mode list, a service running frequency control mode list, or a service running time and service running frequency control mode list. For example, when the service running parameter is the service running time and frequency, it is acquired that a corresponding service control list is the service running time and frequency control mode list. The service control mode list includes at least two service control modes, and each service control mode corresponds to a service running frequency band and a service running time period.

For example, the service running time and service running frequency control mode list is, for example: When the service running time is 0 to 2 hours, and the service running frequency is 0 to 10 times/hour, a first service control mode is selected to perform service control, and the current acquisition value of the user stays unchanged. For example, when the service running time is 2 to 3 hours, and the service running frequency is 10 to 20 times/hour, a second service control mode is selected to perform service control, and the current acquisition value of the user is reduced by 50%. For example, when the service running time is greater than 4 hours, and the service running frequency is greater than 30 times/hour, a third service control mode is selected to perform service control, and the current acquisition value of the user is completely cleared.

For example, in a case where the service running time is 2.5 hours, and the service running frequency is 38 times/hour:

When a priority level of the service running time is higher than that of the service running frequency: in this case, the corresponding service control mode list is acquired according to the service running time. Because in this case, the service running time corresponds to the second service control mode, the current acquisition value of the user is reduced by 50%. When a priority level of the service running frequency is higher than that of the service running time: in this case, the corresponding preset service control mode list is acquired according to the service running frequency. Because in this case, the service running frequency corresponds to the third service control mode, and the current acquisition value of the user is completely cleared.

The service control mode list is not limited to the one above, and certainly there may also be other service control lists, which all fall within the protection scope of the present disclosure, and are not enumerated here.

In step S503, the service running server 12 performs feedback control on the service on the client 11 according to the service control mode.

According to the service control mode selected in step S502, such as to reduce the current acquisition value of the user in the service, and to clear the current acquisition value of the user in the service, running of the service is limited by controlling the current acquisition value of the user in the service. For example, when game earnings in a QQ game are zero, the game stops running.

For example, when the service running time acquired by the service running server 12 is 2.5 hours, the service running frequency is 25 times/hour, and a priority level of the service running time is higher than that of the service running frequency, according to the service running time and frequency control mode list in step S502, the current service running time corresponds to the second service control mode, and the current acquisition value of the user is reduced by 50%.

In the embodiment of the present invention, the service running server 12 acquires service running time and a service running frequency, and when the service running status is the running state, determines a service control mode of the service according to the service running parameter and a preset service control mode list, and performs feedback control on the service on the client 11 according to the service control mode of the service. By means of the foregoing, technical problems in the existing technology that when a service runs for a relatively long time or at a relatively high frequency, a server breaks down easily and network resources are wasted severely are solved, and effective feedback control on a service on a client is implemented.

Figure 6:
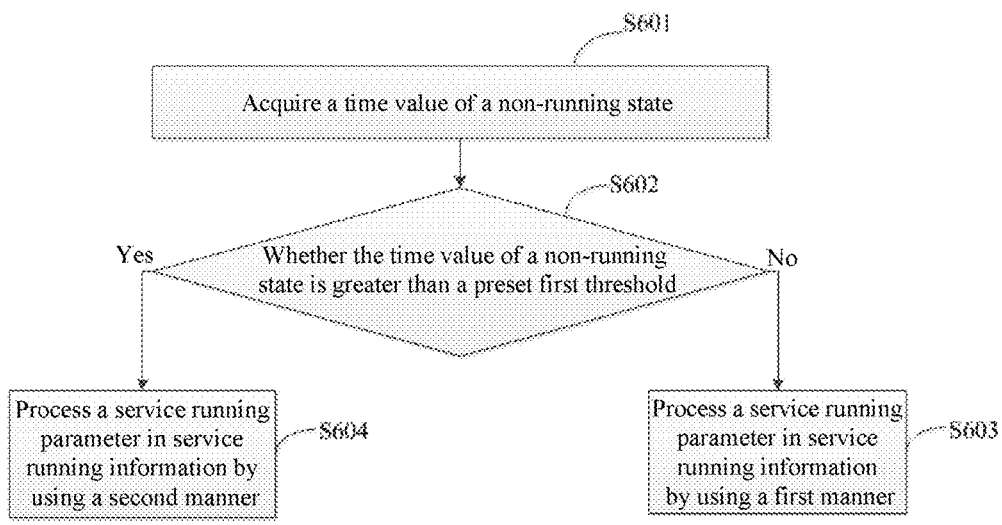
FIG. 6 is a schematic flowchart of a method for controlling running of a service according to an embodiment of the present invention.

Please refer to FIG. 6, which is a schematic flowchart of a method for controlling running of a service according to an embodiment of the present invention. This embodiment is about a subdivided step, when the service running parameter is in the improper service running range, of step S202 in which the server 12 determines the service control mode according to the acquired service running parameter and the preset service control mode list.

In step S601, the service running server 12 acquires a time value of the non-running state.

The service running status includes a running state or a non-running state. The running state in the service running status refers to that the service is currently running, for example, a QQ game that is running. The non-running state in the service running status refers to that a current service stops running, for example, a pause. Certainly, the non-running state in the service running status further includes Power Off. The cases all fall within the protection scope of the present disclosure, and are no longer enumerated herein.

The time value of the non-running state is a time when the current service stops running, for example, a pause time. Certainly, the time value of the non-running state further includes a Power Off time. The cases all fall within the protection scope of the present disclosure, and are no longer enumerated herein.

In step S602, the service running server 12 determines whether the time value of the non-running state is greater than a preset first threshold, and if the time value of the non-running state is greater than the first threshold, perform step S604, or otherwise, perform step S603.

In step S603, the service running parameter in the service running information is processed by using a first manner.

The first threshold is a preset time value of the non-running state. When the time value of the non-running state is less than or equal to the first threshold, the acquired service running time is processed in a first manner. The first manner of processing may be accumulation, addition, and the like. The service running parameter acquired before the non-running state and the service running parameter acquired again after the non-running state is ended are accumulated or added.

For example, the first threshold is time C. When it is detected that the time that the client is paused, is powered off, or crashes does not reach the set time C, the service running time acquired before the pause or Power Off and the service running time acquired again after the pause or Power Off is ended are accumulated. The time value of the non-running state is a pause time, and the preset pause time is between 3 minutes and 10 minutes, for example, the preset pause time is 5 minutes. If the time when the client 11 pauses the service is less than 5 minutes, the time continues to be counted on the basis of the service running time that is recorded before the pause and is, for example, 15 minutes. For example, after the pause is ended, the running time of the service acquired again is 30 minutes. In this case, the service running time is 45 minutes.

In step S604, the service running parameter in the service running information is processed by using a second manner.

When the time value of the non-running state is greater than the first threshold, the acquired service running parameter is processed in a second manner. The second manner of processing may be to reset, to clear or the like, and the service running parameter acquired before the non-running state is reset and the service running parameter starts to be acquired again.

For example, when the first threshold is time C, for example, when it is detected that the time when the client is paused, is powered off, or crashes reaches the set time C, the service running time acquired before the pause or Power Off is cleared. The time value of the non-running state is a pause time, and the preset pause time is between 3 minutes to 10 minutes, for example, the preset pause time is 5 minutes. When the time when the client 11 pauses the service exceeds 5 minutes, the service running time recorded before the pause, for example, 15 minutes are reset, and after the pause is ended, the service running time starts to be acquired again.

In the embodiment of the present invention, the service running server 12 acquires a service running parameter, and determines, when the service running status is the running state, a service control mode of the service according to the service running parameter and a preset service control mode list, and performs feedback control on the service on the client 11 according to the service control mode of the service. By means of the foregoing, technical problems in the existing technology that when a service runs for a relatively long time or at a relatively high frequency, a server breaks down easily and network resources are wasted severely are solved, and effective feedback control on a service on a client is implemented.

Figure 7:
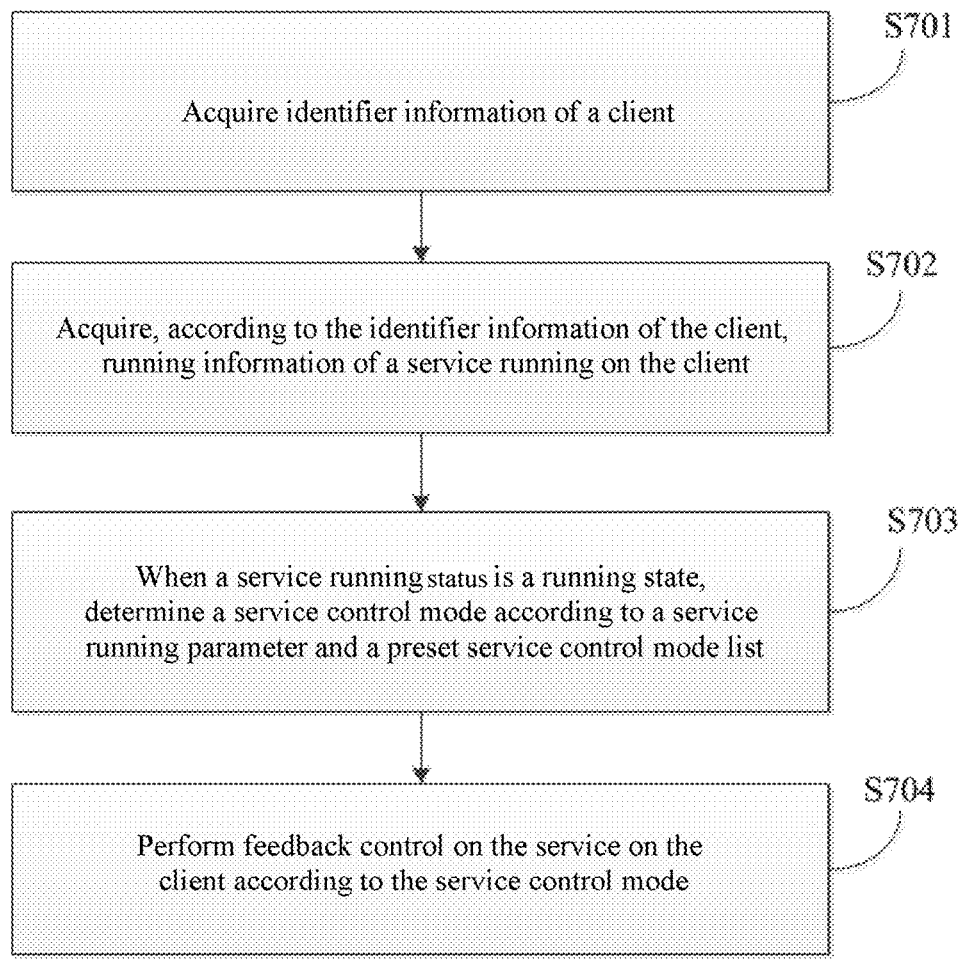
FIG. 7 is a schematic flowchart of a method for controlling running of a service according to an embodiment of the present invention.

Please refer to FIG. 7, which is a schematic flowchart of a method for controlling running of a service according to embodiments of the present disclosure. A user may avoid being controlled during running of a service by changing an account or changing a client. For example, a user uses a different account instead to perform running of a service or changing a different client to perform running of a service. Therefore, in this embodiment, service running is controlled according to identifier information of the client 11, including step S701 and step S702.

In step S701, the service running server 12 acquires identifier information of the client 11.

The identifier information of the client 11 includes account information, identification code information, and biological feature recognition information. The account information includes a login account and the like. The identification code information is, for example, a machine identification code. The biological feature information is, for example, a human face, and a fingerprint. The identifier information is not limited to the types above, and certainly there may also be other identifier information, which all fall within the protection scope of the present disclosure, and are not enumerated here.

In step S702, the service running server 12 acquires, according to the identifier information of the client 11, running information of a service running on the client 11.

The service running server 12 may acquire the identifier information of the client 11 to acquire running information of the service running on one or more clients. For example, when the service is an online game, a login account of a user is acquired, and service running information of an account on different clients is recorded. For example, when a user uses a same account to play a game on multiple machines, a sum of time of game playing on all the machines of the user may be calculated. When the service is an offline game, service running information of the game may be acquired by using the machine identification code. As hardware allows, human face recognition or fingerprint recognition may further be used as identifier information. For example, when a user continuously plays games on a same machine by changing accounts, a sum of time of game playing may be calculated according to the machine identification code without distinguishing specific accounts.

The service running information includes a service running parameter and a service running status. The service running status includes a running state or a non-running state. In this implementation, the service running parameter includes service running time, a service running frequency or a combination of service running time and a service running frequency. Certainly, the service running parameter may further include power consumption and the like, which all fall within the protection scope of the present disclosure, and are no longer elaborated herein.

The running state in the service running status refers to that the service is currently running, for example, a QQ game that is running, and the non-running state in the service running status refers to that a current service stops running, for example, a pause. Certainly, the non-running state in the service running status further includes Power Off. The cases all fall within the protection scope of the present disclosure, and are no longer enumerated herein.

In step S703, when the service running status is the running state, the service running server 12 determines a service control mode according to the service running parameter and a preset service control mode list.

The service running parameter includes service running time, a service running frequency or a combination of service running time and a service running frequency. The service running parameter corresponds to a corresponding service control mode list. The service control mode list includes a service running time control mode list, a service running frequency control mode list, or a service running time and service running frequency control mode list. For example, when the service running parameter is the service running time, it is acquired that the service control list is the service running time control mode list. For example, when the service running parameter is the service running frequency, it is acquired that the service control list is the service running frequency control mode list.

During specific implementation, the service running parameter is compared with a preset threshold of a service running parameter to generate a comparison result, and a corresponding service control mode is selected from the service control mode list according to the comparison result.

How to acquire a corresponding service control mode list according to a service running parameter is described below by using a case where there are two thresholds of a service running parameter. The thresholds of a service running parameter include a proper threshold and an excessive threshold, where the excessive threshold is greater than the proper threshold:

When the service running parameter is less than the proper threshold, the service control mode is to use the service normally. When the service running parameter is greater than or equal to the proper threshold and is less than the excessive threshold, the service control mode is to reduce a current acquisition value of a user in a service. When the service running parameter is greater than or equal to the excessive threshold, the service control mode is to clear a current acquisition value of a user in a service. The current acquisition value of the user in the service includes earnings, achievements, grades, experience, and the like of the service, for example, earnings, achievements, grades, experience, and the like in a QQ game.

The service control list is not limited to the one above, and certainly there may also be other service control lists, which all fall within the protection scope of the present disclosure, and are not enumerated here.

In step 704, the service running server 12 performs feedback control on the service on the client 11 according to the service control mode.

The service control mode includes, for example, to reduce the current acquisition value of the user in the service, and to clear the current acquisition value of the user in the service. Running of the service is limited by controlling the current acquisition value of the user in the service. For example, when game earnings in a QQ game are reset, the game stops running.

In the embodiment of the present invention, the service running server 12 acquires identifier information of the client, and the service running server 12 acquires running information of a service running on the client 11 according to the acquired identifier information of the client, the service running information including a service running parameter and a service running status, and the service running stats including a running state or a non-running state, determines a service control mode according to the service running parameter and a preset service control mode list, and performs feedback control on the service on the client 11 according to the service control mode. By means of the foregoing, technical problems in the existing technology that when a service runs for a relatively long time or at a relatively high frequency, a server breaks down easily and network resources are wasted severely are solved, and effective feedback control on a service on a client is implemented.

Figure 8:
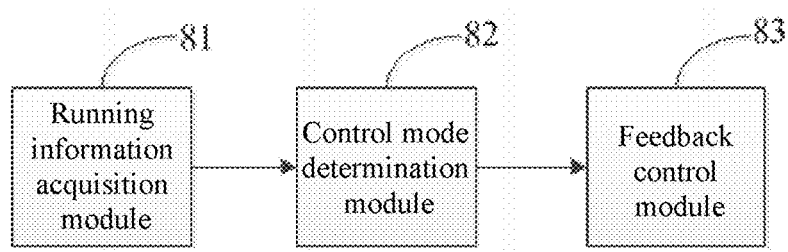
FIG. 8 is a block diagram of an apparatus for controlling running of a service according to an embodiment of the present invention.

Please refer to FIG. 8, which is a schematic structural diagram of an apparatus for controlling running of a service according to an embodiment of the present invention. The apparatus includes a running information acquisition module 81, a control mode determination module 82, and a feedback control module 83.

The running information acquisition module 81 acquires running information of a service running on a client, the service running information including a service running parameter and a service running status, and the service running status including a running state or a non-running state. The service running parameter mentioned in this implementation includes service running time, a service running frequency or a combination of service running time and a service running frequency. Certainly, the service running parameter may further include power consumption and the like, which all fall within the protection scope of the present disclosure, and are no longer elaborated herein.

The running state in the service running status refers to that the service is currently running, for example, a QQ game that is running. The non-running state in the service running status refers to that a current service stops running, for example, a pause. Certainly, the non-running state in the service running status further includes Power Off. The cases all fall within the protection scope of the present disclosure, and are no longer enumerated herein.

When the service running status is the running state, the control mode determination module 82 determines a service control mode according to the service running parameter acquired by the running information acquisition module 81 and a preset service control mode list.

During specific implementation, the service running parameter is compared with a preset threshold of a service running parameter to generate a comparison result, and a corresponding service control mode is selected from the preset service control mode list according to the comparison result.

The threshold of a service running parameter includes a proper running threshold and an excessive running threshold. The excessive running threshold is greater than the proper running threshold: When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range.

The service running parameter includes service running time, a service running frequency or a combination of service running time and a service running frequency. The service running parameter corresponds to a corresponding service control mode list. The service control mode list includes a service running time control mode list, a service running frequency control mode list, or a service running time and service running frequency control mode list. For example, when the service running parameter is the service running time, it is acquired that a corresponding service control list is the service running time control mode list.

During specific implementation, the service running parameter is compared with a preset threshold of a service running parameter to generate a comparison result, and a corresponding service control mode is selected from the preset service control mode list according to the comparison result.

The feedback control module 83 is configured to perform feedback control on the service on the client 11 according to the service control mode determined by the control mode determination module 82. The service control mode includes, for example, to reduce the current acquisition value of the user in the service, and to clear the current acquisition value of the user in the service. Running of the service is limited by controlling the current acquisition value of the user in the service. For example, when game earnings in a QQ game are zero, the game stops running.

Reference may be to the specific description of the method for controlling running of a service in the embodiment in FIG. 2 for specific working principles of the modules in the apparatus for controlling running of a service in the embodiment, which are no longer elaborated one by one herein.

Figure 9:
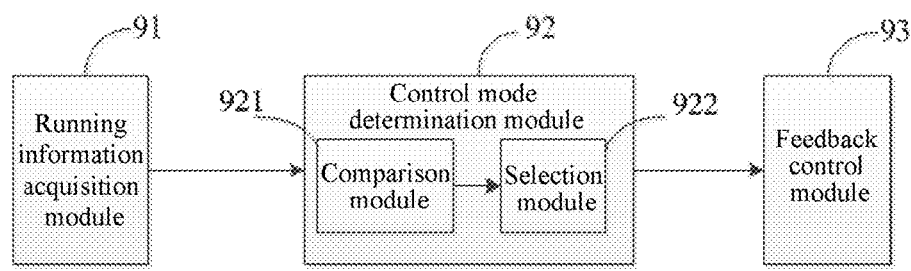
FIG. 9 is a block diagram of an apparatus for controlling running of a service according to an embodiment of the present invention.

Please refer to FIG. 9, which is a schematic structural diagram of an apparatus for controlling running of a service according to an embodiment of the present invention. The apparatus includes a running information acquisition module 91, a control mode determination module 92, and a feedback control module 93. A service running parameter in service running information acquired in the embodiment is service running time.

The running information acquisition module 91 acquires running information of a service running on a client, the service running information including a service running parameter and a service running status, and the service running status including a running state or a non-running state. In this implementation, the service running parameter includes service running time, a service running frequency or a combination of service running time and a service running frequency. Certainly, the service running parameter may further include power consumption and the like, which all fall within the protection scope of the present disclosure, and are no longer elaborated herein.

When the service running status is the running state, the control mode determination module 92 determines a service control mode according to the service running parameter acquired by the running information acquisition module 91 and a preset service control mode list.

The feedback control module 93 performs feedback control on the service on the client 11 according to the service control mode determined by the control mode determination module 92.

The control mode determination module 92 includes a comparison module 921 and a selection module 922, where the comparison module 921 compares the service running parameter with a preset threshold of a service running parameter to generate a comparison result. The selection module 922 selects a corresponding service control mode from the preset service control mode list according to the comparison result generated by the comparison module 921.

During specific implementation, the service running parameter is compared with a preset threshold of a service running parameter to generate a comparison result, and a corresponding service control mode is selected from the preset service control mode list according to the comparison result.

The threshold of a service running parameter includes a proper running threshold and an excessive running threshold. The excessive running threshold is greater than the proper running threshold: When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range.

The service control mode list corresponds to the service running parameter. The service control mode list includes a service running time control mode list, a service running frequency control mode list, or a service running time and service running frequency control mode list. For example, when the service running parameter is the service running time, it is acquired that the service control list is correspondingly the service running time control mode list.

It is acquired according to the acquired service running time that the corresponding service control list is the service running time control mode list. The service control mode list includes at least two service control modes, and each service control mode corresponds to a service running time period.

Reference may be to the specific description of the method for controlling running of a service in the embodiment in FIG. 3 for the specific working principles of the modules in the apparatus for controlling running of a service in the embodiment, which are no longer elaborated one by one herein.

Figure 10:
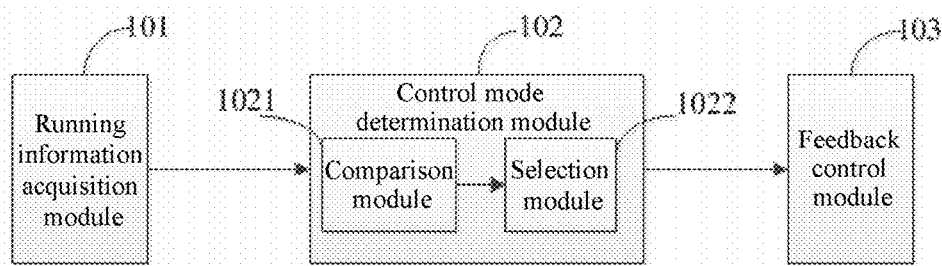
FIG. 10 is a block diagram of an apparatus for controlling running of a service according to an embodiment of the present invention.

Please refer to FIG. 10, which is a schematic structural diagram of an apparatus for controlling running of a service according to an embodiment of the present invention. The apparatus includes a running information acquisition module 101, a control mode determination module 102, and a feedback control module 103. A service running parameter of service running information acquired in the embodiment is a service running frequency.

The running information acquisition module 101 acquires running information of a service running on a client, the service running information including a service running parameter and a service running status, and the service running status including a running state or a non-running state. The service running parameter mentioned in this implementation includes service running time, a service running frequency or a combination of service running time and a service running frequency. Certainly, the service running parameter may further include power consumption and the like, which all fall within the protection scope of the present disclosure, and are no longer elaborated herein.

When the service running status is the running state, the control mode determination module 102 determines a service control mode according to the service running parameter acquired by the running information acquisition module 101 and a preset service control mode list.

The service control mode list corresponds to the service running parameter. The service control mode list includes a service running time control mode list, a service running frequency control mode list, or a service running time and service running frequency control mode list. For example, when the service running parameter is the service running time, it is acquired that the service control list is correspondingly the service running time control mode list.

It is acquired according to the acquired service running frequency that the corresponding service control list is the service running frequency control mode list. The service control mode list includes at least two service control modes, and each service control mode corresponds to a service running frequency band.

The feedback control module 103 performs feedback control on the service on the client 11 according to the service control mode selected by the control mode determination module 102.

The control mode determination module includes: a comparison module 1021, configured to compare the service running parameter with a preset threshold of a service running parameter to generate a comparison result; and a selection module 1022, configured to select a corresponding service control mode from the service control mode list according to the comparison result acquired by the comparison module 1021.

During specific implementation, the service running parameter is compared with a preset threshold of a service running parameter to generate a comparison result, and a corresponding service control mode is selected from the service control mode list according to the comparison result.

The threshold of a service running parameter includes a proper running threshold and an excessive running threshold. The excessive running threshold is greater than the proper running threshold: When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range.

Reference may be to the specific description of the method for controlling running of a service in the embodiment in FIG. 4 for the specific working principles of the modules in the apparatus for controlling running of a service in the embodiment, which are no longer elaborated one by one herein.

Figure 11:
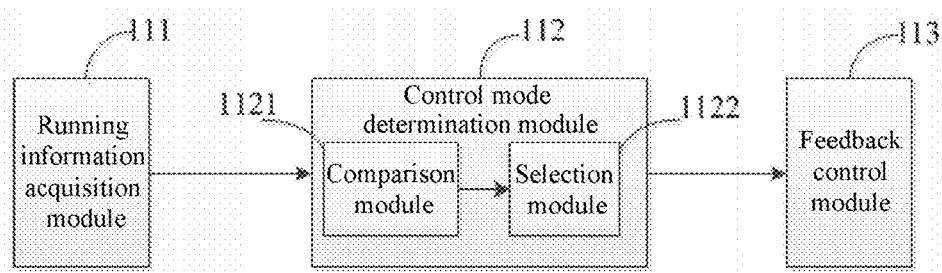
FIG. 11 is a block diagram of an apparatus for controlling running of a service according to an embodiment of the present invention.

Please refer to FIG. 11, which is a schematic structural diagram of an apparatus for controlling running of a service according to an embodiment of the present invention. The apparatus includes a running information acquisition module 111, a control mode determination module 112, and a feedback control module 113. A service running parameter in service running information acquired in the embodiment is service running time and a service running frequency.

The running information acquisition module 111 acquires running information of a service running on the client 11, the service running information including a service running parameter and a service running status, and the service running status including a running state or a non-running state. The service running parameter in this implementation includes service running time, a service running frequency or a combination of service running time and a service running frequency. Certainly, the service running parameter may further include power consumption and the like, which all fall within the protection scope of the present disclosure, and are no longer elaborated herein. The control mode determination module 112 determines, when the service running status is the running state, a service control mode according to the service running parameter acquired by the running information acquisition module 111 and a preset service control mode list. The control mode determination module includes: a comparison module 1121, configured to compare the service running parameter with a preset threshold of a service running parameter to generate a comparison result; and a selection module 1122, configured to select a corresponding service control mode from the preset service control mode list according to a comparison result acquired by the comparison module 1121.

During specific implementation, the service running parameter is compared with a preset threshold of a service running parameter to generate a comparison result, and a corresponding service control mode is selected from the preset service control mode list according to the comparison result.

The threshold of a service running parameter includes a proper running threshold and an excessive running threshold. The excessive running threshold is greater than the proper running threshold: When the service running parameter is less than the proper running threshold, it indicates a proper service running range, and the service control mode is to use the service normally. When the service running parameter is greater than or equal to the proper running threshold, it indicates an improper service running range, and the service control mode is to limit use of the service. For example, it is set that the proper running threshold is A and the excessive running threshold is B (B is greater than A). When the service running parameter is less than A, it indicates a proper service running range, and when the service running parameter is greater than or equal to A, it indicates an improper service running range. The service control mode list corresponds to the service running parameter. The service control mode list includes a service running time control mode list, a service running frequency control mode list, or a service running time and service running frequency control mode list. For example, when the service running parameter is the service running time, it is acquired that the service control list is correspondingly the service running time control mode list.

It is acquired according to the acquired service running time and frequency that correspondingly the service control list is the service running time and frequency control mode list. The service control mode list includes at least two service control modes, and each service control mode corresponds to service running time and a service running frequency band.

The feedback control module 113 performs feedback control on the service on the client 11 according to the service control mode selected by the control mode determination module 112.

Reference may be made to the specific description of the method for controlling running of a service in the embodiment in FIG. 5 for the specific working principles of the modules in the apparatus for controlling running of a service in the embodiment, which are no longer elaborated one by one herein.

Figure 12:
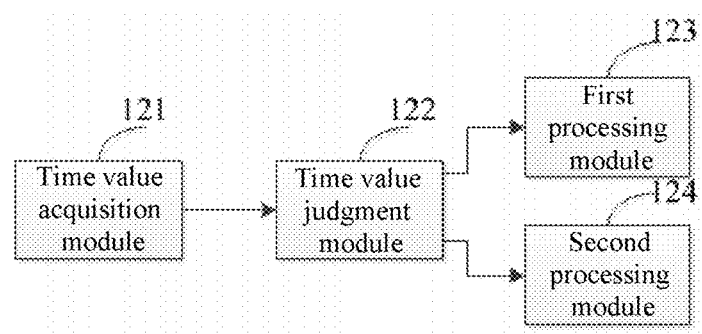
FIG. 12 is a block diagram of an apparatus for controlling running of a service according to an embodiment of the present invention.

Please refer to FIG. 12, which is a schematic structural diagram of an apparatus for controlling running of a service according to an embodiment of the present invention. In this embodiment, when the service running parameter is in the improper service running range, the control mode determination module 82 further includes: a time value acquisition module 121, a time value judgment module 122, a first processing module 123, and a second processing module 124.

The time value acquisition module 121 is configured to acquire a time value of a non-running state of a service. The service running status includes a running state or a non-running state. The running state in the service running status refers to that the service is currently running, for example, a QQ game that is running. The non-running state in the service running status refers to that a current service stops running, for example, a pause. Certainly, the non-running state in the service running status further includes Power Off. The cases all fall within the protection scope of the present disclosure, and are no longer enumerated herein.

The time value of the non-running state is a time when the current service stops running, for example, a pause time. Certainly, the time value of the non-running state further includes a Power Off time. The cases all fall within the protection scope of the present disclosure, and are no longer enumerated herein.

The time value judgment module 122 is configured to determine whether the time value of the non-running state is greater than the preset first threshold.

The first processing module 123 is configured to process, when a determination result of the time value judgment module 122 is that the time value of the non-running state is less than or equal to the preset first threshold, the acquired service running parameter in a first manner.

The first threshold is a preset time value of the non-running state. The first manner of processing may be accumulation, addition, and the like. The service running parameter acquired before the non-running state and the service running parameter acquired again after the non-running state is ended are accumulated or added.

For example, the first threshold is time C. When it is detected that the time that the client is paused, is powered off, or crashes does not reach the set time C, the service running time acquired before the pause or Power Off and the service running time acquired again after the pause or Power Off is ended are accumulated. The time of the non-running state is a pause time, and the preset pause time is between 3 minutes and 10 minutes, for example, the preset pause time is 5 minutes. If the time when the client 11 pauses the service is less than 5 minutes, the time continues to be counted on the basis of the service running time that is recorded before the pause and is, for example, 15 minutes. For example, after the pause is ended, the running time of the service acquired again is 30 minutes. In this case, the service running time is 45 minutes.

The second processing module 124 is configured to process, when the determination result of the time value judgment module 122 is that the time value of the non-running state is greater than the first threshold, the acquired service running parameter in a second manner.

The second manner of processing may be to reset, to clear or the like. The service running parameter starts to be acquired again after the service running parameter acquired before the non-running state is reset.

For example, when the first threshold is time C, for example, when it is detected that the time when the client is paused, is powered off, or crashes reaches the set time C, the service running time acquired before the pause or Power Off is cleared. The time of the non-running state is a pause time, and the preset pause time is between 3 minutes to 10 minutes, for example, the preset pause time is 5 minutes. When the time when the client 11 pauses the service exceeds 5 minutes, the service running time recorded before the pause, for example, 15 minutes are reset, and after the pause is ended, the service running time starts to be acquired again.

Reference may be made to the specific description of the method for controlling running of a service in the embodiment in FIG. 6 for the specific working principles of the modules in the apparatus for controlling running of a service in the embodiment, which are no longer elaborated one by one herein.

Figure 13:
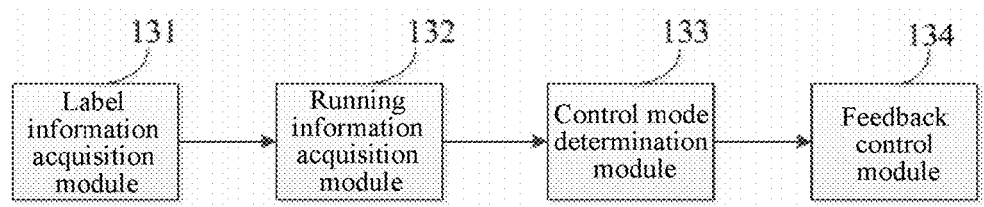
FIG. 13 is a block diagram of an apparatus for controlling running of a service according to an embodiment of the present invention.

Please refer to FIG. 13, which is a schematic structural diagram of an apparatus for controlling running of a service according to an embodiment of the present invention. The apparatus includes a label information acquisition module 131, a running information acquisition module 132, a control mode determination module 133, and a feedback control module 134.

The identifier information acquisition module 131 acquires identifier information of a client. The identifier information of the client includes account information, identification code information, and biological feature recognition information. The account information includes a login account and the like. The identification code information is, for example, a machine identification code. The biological feature information is, for example, a human face, and a fingerprint. The identifier information is not limited to the type above, and certainly there may also be other identifier information, which all fall within the protection scope of the present disclosure, and are not enumerated here.

The running information acquisition module 132 acquires, according to the identifier information acquired by the identifier information acquisition module 131, running information of a service running on the client, the service running information including a service running parameter and a service running status, and the service running status including a running state or a non-running state. The service running parameter mentioned in this implementation includes service running time, a service running frequency or a combination of service running time and a service running frequency. Certainly, the service running parameter may further include power consumption and the like, which all fall within the protection scope of the present disclosure, and are no longer elaborated herein.

The service running server 12 may acquire the identifier information of the client 11 to acquire running information of the service running on one or more clients. For example, when the service is an online game, a login account of a user is acquired, and service running information of an account on different clients is recorded. For example, when a user uses a same account to play a game on multiple machines, a sum of time of game playing on all the machines of the user may be calculated. When the service is an offline game, service running information of the game may be acquired by using the machine identification code. As hardware allows, human face recognition or fingerprint recognition may further be used as identifier information. For example, when a user continuously plays games on a same machine by changing accounts, a sum of time of game playing may be calculated according to the machine identification code without distinguishing specific accounts.

The running state in the service running status refers to that the service is currently running, for example, a QQ game that is running. The non-running state in the service running status refers to that a current service stops running, for example, a pause. Certainly, the non-running state in the service running status further includes Power Off. The cases all fall within the protection scope of the present disclosure, and are no longer enumerated herein.

The control mode determination module 133 determines, when the service running status is the running state, a service control mode according to the service running parameter acquired by the running information acquisition module 132 and a preset service control mode list.

The service running parameter includes service running time, a service running frequency or a combination of service running time and a service running frequency. The service running parameter corresponds to a corresponding service control mode list. The service control mode list includes a service running time control mode list, a service running frequency control mode list, or a service running time and service running frequency control mode list. For example, when the service running parameter is the service running time, it is acquired that the corresponding preset service control list is the service running time control mode list.

During specific implementation, the service running parameter is compared with a preset threshold of a service running parameter to generate a comparison result, and a corresponding service control mode is selected from the preset service control mode list according to the comparison result.

The feedback control module 134 performs feedback control on the service on the client according to the service control mode selected by the control mode determination module 133. The service control mode includes, for example, to reduce the current acquisition value of the user in the service, and to clear the current acquisition value of the user in the service. Running of the service is limited by controlling the current acquisition value of the user in the service. For example, when game earnings in a QQ game are reset, the game stops running.

Reference may be to the specific description of the method for controlling running of a service in the embodiment in FIG. 7 for the specific working principles of the modules in the apparatus for controlling running of a service in the embodiment, which are no longer elaborated one by one herein.

The apparatus for controlling running of a service provided in the embodiment of the present invention may be formed in a terminal or touch device. The terminal is, for example, a computer, a tablet computer, and a mobile phone having a touch function. The apparatuses for controlling running of a service share the same concept with the methods for controlling running of a service in the embodiments above. Any method provided in the embodiment of the method for controlling running of a service may be run on the apparatus for controlling running of a service, and reference may be made to the embodiments of the method for controlling running of a service for the specific implementation process of the apparatus, which is no longer elaborated herein.

It should be noted that for the methods for controlling running of a service in the embodiments of the present invention, a person of ordinary skill in the art may understand that all or some of the steps in the method for controlling running of a service may be implemented by a computer program controlling relevant hardware. The computer program may be stored in a computer-readable storage medium, for example, stored in a memory in a terminal, and is executed by at least one processor in the terminal. During the execution, the procedures of the embodiments of the methods in FIG. 2 to FIG. 6 may be included. The storage medium may be a magnetic disk, an optical disk, a Read-Only Memory (ROM), a Random Access Memory (RAM), and the like.

For the apparatuses for controlling running of a service in the embodiments of the present invention, the functional modules of the apparatuses may be integrated into one processing chip, or each of the modules may exist alone physically, or two or more modules may be integrated into one module. The integrated module may be implemented in the form of hardware, or may be implemented in the form of a software functional module. If implemented in the form of software functional modules and sold or used as an independent product, the integrated module may also be stored in a computer readable storage medium. The storage medium is, for example, a ROM, a magnetic disk, an optical disc, or the like.

In conclusion, the present disclosure has been disclosed above through preferred embodiments, but is not intended to be limited thereto. Various variations and modifications made by persons skilled in the art without departing from the spirit and scope of the present disclosure fall within the scope of the present disclosure as defined by the appended claims.

The invention claimed is:

1. A method for controlling running of a service at a client by a server comprising:
   acquiring service running information of the service on the client, the service running information comprising a service running parameter containing a service running frequency representing a number of times the service runs during a predetermined time unit, and a service running status comprising one of a running state or a non-running state while the service is launched;
   determining, when the service running status of the service is the running state, a service control mode of the service among a preset service control mode list comprising at least a normal service control mode, a reducing service control mode, and an eliminating service control mode according to the service running parameter by;
      comparing the service running frequency with a first preset lower frequency threshold and a second preset higher frequency threshold;
      setting the service control mode to the normal service control mode when the service running frequency is below the first preset lower frequency threshold;
      setting the service control mode to the reducing service control mode when the service running frequency is between the first preset lower frequency threshold and the second preset higher frequency threshold; and
      setting the service control mode to the eliminating service control mode when the service running frequency is higher than the second preset higher frequency threshold; and
   performing feedback control on the service by:
      retaining a current acquisition value of a user of the service when the service control mode is in the normal service control mode;
      reducing the current acquisition value of the user of the service when the service control mode is in the reducing service control mode;
      clearing the current acquisition value of the user of the service when the service control mode is in the eliminating service control mode; and
      when the current acquisition value of the user of the service is reduced to zero or is eliminated, stopping running the service.

2. The method according to claim 1, upon acquiring service running information of a service on a client, the method further comprising:
   acquiring a time value of the non-running state, and determining whether the time value of the non-running state is greater than a preset first threshold;
   using, if the time value of the non-running state is less than or equal to the first threshold, a preset first manner to process the service running parameter in the service running information; and using, if the time value of the non-running state is greater than the first threshold, a preset second manner to process the service running parameter in the service running information.

3. The method according to claim 1, wherein upon acquiring service running information of a service on a client, the method further comprising acquiring identifier information of the client,
wherein the step of acquiring service running information of a service on a client comprises acquiring the service running information of the service on the client according to the identifier information of the client.

4. The method according to claim 3, wherein the identifier information of the client comprises at least one of account information, identification code information, or biological feature recognition information.

5. An apparatus for controlling running of a service, comprising:
one or more processors;
a memory storing one or more programs; and
wherein the one or more programs stored in the memory and when executed by the one or more processors, are configured to cause the apparatus to:
acquire service running information of a service on a client, wherein the service running information comprising a service running parameter containing a service running frequency representing a number of times the service runs during a predetermined time unit and a service running status comprising one of a running state or a non-running state while the service is launched;
determine, when the service running status of the service is the running state, a service control mode of the service among a preset service control mode list comprising at least a normal service control mode, a reducing service control mode, and an eliminating service control mode according to the service running parameter by:
comparing the service running frequency with a first preset lower frequency threshold and a second preset higher frequency threshold;
setting the service control mode to the normal service control mode when the service running frequency is below the first preset lower frequency threshold;
setting the service control mode to the reducing service control mode when the service running frequency is between the first preset lower frequency threshold and the second preset higher frequency threshold; and
setting the service control mode to the eliminating service control mode when the service running frequency is higher than the second preset higher frequency threshold; and
perform feedback control on the service by:
retaining a current acquisition value of a user of the service when the service control mode is in the normal service control mode;
reducing the current acquisition value of the user of the service when the service control mode is in the reducing service control mode;
clearing the current acquisition value of the user of the service when the service control mode is in the eliminating service control mode; and
when the current acquisition value of the user of the service is reduced to zero or is eliminated, stopping running the service.

6. The apparatus according to claim 5, wherein the one or more programs, when executed by the one or more processors, are further configured to cause the apparatus to:
acquire a time value of the non-running state;
determine whether the time value of the non-running state is greater than a preset first threshold;
process, upon determining that the time value of the non-running state is less than or equal to the first threshold, the service running parameter in the service running information by using a preset first manner; and
process, upon determining that the time value of the non-running state is greater than the first threshold, the service running parameter in the service running information by using a preset second manner.

7. The apparatus according to claim 5, wherein the one or more programs, when executed by the one or more processors, are further configured to cause the apparatus to:
acquire identifier information of the client; and
acquire the service running information of the service on the client according to the identifier information of the client.

8. The apparatus according to claim 7, wherein the identifier information of the client comprises at least one of account information, identification code information, or biological feature recognition information.

9. A method for controlling running of a service at a client by a server comprising:
acquiring service running information of the service on the client, the service running information comprising a service running parameter containing a service running time, and a service running status-comprising one of a running state or a non-running state while the service is launched;
determining, when the service running status of the service is the running state, a service control mode of the service among a preset service control mode list comprising at least a normal service control mode, a reducing service control mode, and an eliminating service control mode according to the service running parameter by:
comparing the service running time with a first preset lower time threshold and a second preset higher time threshold;
setting the service control mode to the normal service control mode when the service running time is below the first preset lower time threshold;
setting the service control mode to the reducing service control mode when the service running time is between the first preset lower time threshold and the second preset higher time threshold; and
setting the service control mode to the eliminating service control mode when the service running time is higher than the second preset higher time threshold; and
performing feedback control on the service by:
retaining a current acquisition value of a user of the service when the service control mode is in the normal service control mode;
reducing the current acquisition value of the user of the service when the service control mode is in the reducing service control mode;
clearing the current acquisition value of the user of the service when the service control mode is in the eliminating service control mode; and when the current acquisition value of the user of the service is reduced to zero or is eliminated, stopping running the service.

\* \* \* \* \*